J. B. ARMSTRONG.
FURNACES FOR HEATING STEEL IN TEMPERING.
No. 7,644. Reissued May 1, 1877.
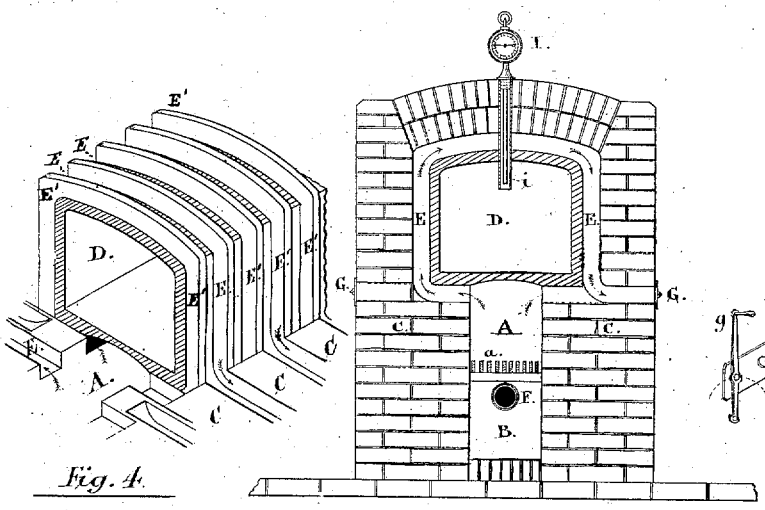
Fig. 4.
Fig. 2.
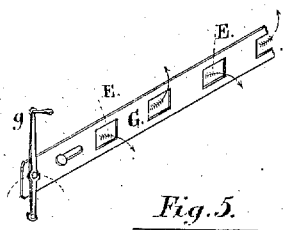
Fig. 5.
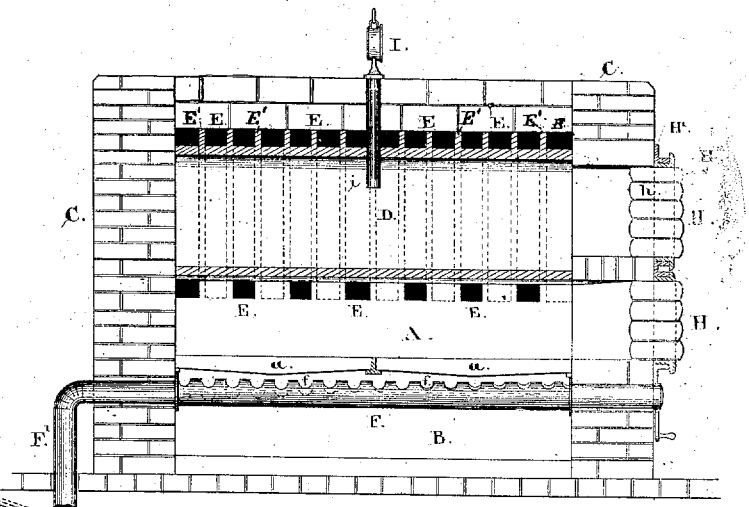
Fig. 1.
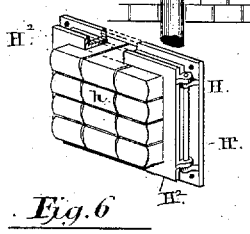
Fig. 6
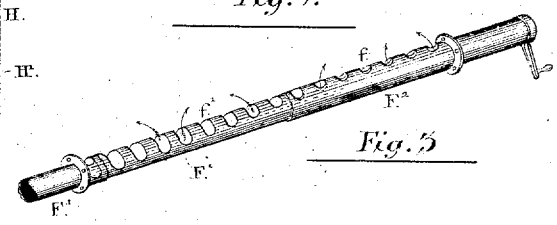
Fig. 3
Witnesses:
A. H. Warren
William Norman
Inventor:
John Belmer Armstrong
by Redout, Kirkpatrick & Co
Attys.

UNITED STATES PATENT OFFICE.

JOHN B. ARMSTRONG, OF GUELPH, ONTARIO, CANADA.

IMPROVEMENT IN FURNACES FOR HEATING STEEL IN TEMPERING.

Specification forming part of Letters Patent No. 170,430, dated November 30, 1875; reissue No. 7,644, dated May 1, 1877; application filed February 28, 1877.

*To all whom it may concern:*

Be it known that I, JOHN BELMER ARMSTRONG, of the town of Guelph, in the county of Wellington, in the Province of Ontario, Canada, carriage-spring manufacturer, have invented a new and useful Improvement in Furnaces for Heating Steel in Tempering; which improvement is fully set forth in the following specification, reference being had to the accompanying drawings.

My invention relates to the heating of articles manufactured from steel, or from steel and iron, in tempering. It consists of a close oven or retort, to which a pyrometer is attached, heated from a blast-furnace placed below the retort, or in any other convenient position, the heat from the furnace being forced to circulate freely around the retort in flues which receive and discharge on alternate sides, the blast and discharge being regulated by peculiarly-constructed dampers.

The object of my invention is to uniformly raise the temperature of the contents of the retort to any required degree of heat, and to hold the temperature stationary at such degree until the whole mass of the contents has thoroughly and uniformly acquired the desired degree of heat.

My invention has a double application in the art of heating steel for tempering—first, heating the steel uniformly to a stated degree before hardening in oil or any of the usual liquids; second, drawing or "letting down" the temper of steel, after hardening in the usual way, to a uniform degree.

In the accompanying drawings, Figure 1 is a longitudinal section, and Fig. 2 is a cross-section, of a tempering-furnace constructed according to my invention. Fig. 3 is a detail of the damper used in regulating and distributing the heat. Fig. 4 is a detail of retort, showing flues, &c. Fig. 5 is a detail of cut-off-dampers. Fig. 6 is a detail of furnace and retort doors.

A is a furnace, constructed, in the usual way, of brick or other suitable material, having an ash-pit, B, underneath. *a* are the usual grate-bars, resting on the side walls C. Immediately over the furnace the close retort D is placed, the bottom of the retort forming the roof of the furnace. The walls, roof, and floor of the retort are constructed of fire-clay, fire-brick, or other suitable material, when the retort is used for heating the steel to harden; but when the furnace is to be used only for drawing the temper after hardening, a cast or wrought iron retort may be used, as a less degree of heat is required than in the former process. E are flues which take the flame, heated gases, &c., from the upper part of the furnace, up one side, over the top, and down the other side of the retort, the heated gases, smoke, &c., escaping through suitable passages to a common vent. These flues E are narrow passages, formed along the whole length of the retort, the intervening walls being thin partitions, E′, of fire-clay or cast-iron. The flues are so arranged that they take the draft from and deliver it at alternate sides of the furnace, thus equalizing the distribution of the heat over the whole surface of the retort. F is the blast-pipe placed beneath and extending under the whole length of the furnace. The blast-pipe F is cylindrical in shape, the upper surface being perforated with holes *f*, of any convenient diameter, placed at a regular distance apart throughout the entire length under the furnace. Fitting within the outer pipe $F^1$ is an inner revolving tube or damper, $F^2$, perforated with holes *f′*, at the same distance apart longitudinally as those in the outer tube, the only difference being that the holes *f′* are elongated in a transverse direction, and are cut to form a spiral on the tube $F^2$. The object in thus cutting the holes in the inner tube or damper $F^2$ is to enable the operator to vary the position of the delivery of the blast, in order to equalize the heat in the furnace and retort. Thus he may give an equal distribution of the blast throughout the entire length of the furnace, or he may cut it off, partially or entirely, at one end, throwing the whole blast into the other end, or vice versa. G G are cut-off dampers, arranged to close the exit ends of the flues E, regulating the discharge of the heated gases, &c., from the furnace. H H are the doors of the furnace and retort, hinged to and fitting on the frames $H^1$, as shown. The frames $H^1$ are bolted or fastened to the brick-work in any convenient way, the opening in the frames for the doors being larger than the holes left in the brick-work. Thus a rim of brick-work appears around the entire inner edge of the frames. The doors consist of an open frame of iron, $H^2$, filled in with fire-bricks *h*, the bricks fitting, when the door is closed, within the opening left in the brick-work. Thus no portion of the iron door or frame is exposed to the action of the heat. As the fire-bricks are burned away they are pushed forward again and again until consumed, when new bricks are inserted, as before. I is a pyrometer of the usual construction, fitted to the top of the retort in such a way that the expanding-bar extends downward into the interior of the retort within an open guard-tube, *i*.

Having now described the parts of my invention, I will proceed to describe its operation: For the purposes of example, we will suppose that the retort is charged with single-plate cast-steel carriage-springs. These springs are thick in the center, tapering away to each end. The furnace never cools during the night, the walls being constructed thick enough to retain the heat. The operator knows the degree of heat to which the steel requires to be raised in order to give it the desired temper. He watches the face of the pyrometer, and, by manipulating the blast and blast-discharge, he is enabled to bring the whole of the contents up to, without exceeding, the proper degree of heat. Of course the thinner portion, of the plates reach that degree first; but they can go no higher than the degree indicated on the pyrometer, waiting, as it were, until the thicker portion has been thoroughly permeated, and the whole mass is in one uniform heat, when the springs are taken out and dipped.

In lowering or "letting down" the temper after hardening, the same operation is repeated, the operator knowing the particular degrees of heat which correspond to different tempers, and working accordingly. In "letting down" temper, the degree of heat is not required to be so high as in the former case, and the retort, if used specially for this purpose, may be constructed of cast-iron. Furnaces for tempering very long saws, &c., may be fitted with two pyrometers; but in ordinary cases the heat can be perfectly regulated by the spirally-arranged dampers with one.

The advantages gained by my invention are, first, that steel of regular and irregular shapes and thicknesses can be raised to, without any portion being allowed to exceed, a uniform degree of heat in tempering; second, that the blast to the furnace can be applied equally or unequally during its whole length, to suit circumstances; third, that by the application of the pyrometer, the operator is enabled to gage the heat in the retort, raising or lowering the temperature of the furnace accordingly, and, knowing the degrees of heat which give the steel certain tempers, he is enabled to turn out every charge to a known and exact temper.

I claim as my invention—

1. In a furnace for heating steel in tempering, the retort D, formed at intervals around its entire length with partitions E′, to form narrow passages or flues E, said flues being arranged or opening alternately, first on one side and then on the other, so that they take the draft from and deliver it at alternate sides of the furnace, thus equalizing the distribution of the heat over the whole surface of the retort, substantially as described.

2. The blast-pipe F, consisting of the inner pipe $F^1$, perforated with the spirally-arranged holes *f′*, in combination with the outer pipe $F^2$, perforated with the holes *f*, arranged and operating substantially as described, and for the purpose specified.

3. The doors H, consisting of the frames $H^1$, constructed to leave a margin of brick-work between the inner edge of the furnace and retort openings, and the iron door $H^2$, fitted in with fire-brick *h*, arranged and operating substantially as described, and for the purpose specified.

4. The combination and arrangement, in a furnace for heating steel in tempering, of furnace A C, retort D, constructed with alternate opening and discharging flues E E′, blast-pipe F $F^1$ $F^2$, and doors H $H^1$ $H^2$, composed of iron and fire-brick, all constructed and adapted to operate substantially as and for the purposes described and shown.

J. B. ARMSTRONG.

Witnesses:
T. H. SCARFF,
WM. E. SLAKER.